UNITED STATES PATENT OFFICE.

WILLIAM H. HOAG, OF AMSTERDAM, NEW YORK.

COMPOSITION AND MANUFACTURE OF STOVE BRICKS AND LININGS.

SPECIFICATION forming part of Letters Patent No. 248,651, dated October 25, 1881.

Application filed August 29, 1881. (No specimens.)

*To all whom it may concern:*

Be it known that I, WILLIAM H. HOAG, a citizen of the United States, residing at Amsterdam, in the county of Montgomery and State of New York, have invented certain new and useful Improvements in the Composition and Manufacture of Stove Bricks and Linings; and I do hereby declare the following to be a full, clear, and exact description of the invention, such as will enable others skilled in the art to which it appertains to make and use the same.

My invention consists in an improved compound for the manufacture of fire-brick or stove-lining, and is applicable, in the manufacture of brick, for all the purposes to which fire-brick may be applied.

The objects of my invention are, first, to produce a compound for stove brick or lining that will be more durable than any heretofore in use; second, that said brick or lining, when hardened by heat, will remain hard and smooth, so that ashes and clinkers will not adhere thereto.

To carry my invention into effect I take of pulverized fire-brick, fifty per cent.; common red clay, twenty per cent.; Jersey clay, twenty per cent.; yellow fire-sand, seven per cent.; ground coke-dust, two per cent.; ground Ohio grindstone, three-fourths of one per cent.; water-lime, one-fourth of one per cent. I thoroughly pulverize and mix these ingredients, then sift through a fine sieve, after which I mix all together with hot water into a homogeneous mass until it is of the consistency of stiff putty. Then I press or form the same into blocks or cakes. While in a plastic state the blocks so formed are removed from the press and cut in any desired shape to fit the stove or furnace.

As soon as the cakes are placed in the stove I thoroughly pound them down and sprinkle or wash the surface with salt-brine, then use a trowel to make a smooth-finished job.

My improved composition causes the brick to be harder, to retain its shape in the stove longer, and to remain smoother and more durable than any other heretofore in use.

The coke-dust, fire-sand, water-lime, and Ohio grindstone, when united with the clays and fire-brick in the proportions named, have the effect of preventing the clays from cracking when dried by fire. Therefore when fire comes in contact with the mass it solidifies and remains in shape as originally placed in the stove, and so smooth that ashes and clinkers do not adhere to the surface. Consequently greater heat can be produced with less fuel.

I am aware that it is common to use clay and sand in the manufacture of fire-brick; but a decided improvement is gained by combining the additional ingredients named, and in the proportions according to my improved process.

Having fully described my invention, what I desire to claim, and secure by Letters Patent, is—

A composition for stove brick or lining consisting of pulverized fire-brick, red clay, Jersey clay, yellow fire-sand, coke-dust, water-lime, and grindstone, when combined in the proportions and in the manner substantially as herein specified.

In testimony whereof I affix my signature in presence of two witnesses.

WILLIAM H. HOAG.

Witnesses:
JOHN FEA,
D. S. DUNLAP.